US009667695B2

(12) United States Patent
Ling et al.

(10) Patent No.: US 9,667,695 B2
(45) Date of Patent: May 30, 2017

(54) METHOD AND DEVICE FOR PUBLISHING PROMOTION CONTENTS AND COMPUTER STORAGE MEDIUM

(71) Applicant: TENCENT TECHNOLOGY (SHENZHEN) COMPANY LIMITED, Guangdong (CN)

(72) Inventors: Guo Ling, Guangdong (CN); Yang Guo, Guangdong (CN); Ganrong Yang, Guangdong (CN); Yuan Zhao, Guangdong (CN); Liangliang Fan, Guangdong (CN); Linping Tang, Guangdong (CN); Leteng Weng, Guangdong (CN); Juanjuan Liang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 426 days.

(21) Appl. No.: 14/315,207

(22) Filed: Jun. 25, 2014

(65) Prior Publication Data
US 2014/0330892 A1 Nov. 6, 2014

Related U.S. Application Data

(63) Continuation of application No. PCT/CN2012/086568, filed on Dec. 13, 2012.

(30) Foreign Application Priority Data

Dec. 28, 2011 (CN) .......................... 2011 1 0447849

(51) Int. Cl.
G06F 15/16 (2006.01)
H04L 29/08 (2006.01)
(Continued)

(52) U.S. Cl.
CPC ........ *H04L 67/06* (2013.01); *G06F 17/30091* (2013.01); *G06F 17/30876* (2013.01); *G06F 17/30941* (2013.01); *G06Q 30/02* (2013.01)

(58) Field of Classification Search
USPC ............... 709/228, 231; 725/74; 348/56; 1/1
See application file for complete search history.

(56) References Cited

U.S. PATENT DOCUMENTS 8,505,054 B1 * 8/2013 Kirley ................ H04N 21/4307
725/74
9,307,042 B2 * 4/2016 Wu ...................... H04L 67/2823
(Continued)

FOREIGN PATENT DOCUMENTS

CN 101119223 A 2/2008
CN 101119517 A 2/2008
(Continued)

OTHER PUBLICATIONS

International Search Report for PCT/CN2012/086568 mailed on Mar. 21, 2013, 2 pages.
(Continued)

Primary Examiner — Quang N Nguyen
(74) Attorney, Agent, or Firm — Knobbe Martens Olson & Bear LLP

(57) ABSTRACT

A method and device for publishing promotion contents and computer storage medium are described. The compatibility of the promotion content publishing method can be enhanced and an accurate delivery of the promotion content can be achieved. In the method, a description file is issued to the client. The client then downloads promotion content suitable for its own operation system platform and device according to the description file. Thus the method can be used in different platforms and devices including iOS, Android, WinCE, S60v3, S60v5 and etc. The server can identify the platform of the client, the type of the device and
(Continued)

the function opened on the client, thus an accurate delivery of promotion content to specific type of client can be achieved.

8 Claims, 1 Drawing Sheet

(51) Int. Cl.
*G06Q 30/02* (2012.01)
*G06F 17/30* (2006.01)

(56) References Cited

U.S. PATENT DOCUMENTS

| | | | | |
|---|---|---|---|---|
| 2006/0224761 | A1* | 10/2006 | Howarth | H04N 21/235 709/231 |
| 2011/0138064 | A1* | 6/2011 | Rieger | G06F 17/30905 709/228 |
| 2012/0062712 | A1* | 3/2012 | Kesseler | H04N 13/0059 348/56 |

FOREIGN PATENT DOCUMENTS

| | | |
|---|---|---|
| CN | 101895872 A | 11/2010 |
| CN | 102185917 A | 9/2011 |
| EP | 1659487 A2 | 5/2006 |

OTHER PUBLICATIONS

Office Action issued in Chinese Patent Application No. 201110447849.X, on Dec. 12, 2014.

* cited by examiner

METHOD AND DEVICE FOR PUBLISHING PROMOTION CONTENTS AND COMPUTER STORAGE MEDIUM

CROSS REFERENCE

This patent application is a continuation of an International application No. PCT/CN2012/086568 filed on Dec. 13, 2012, which claims priority of a Chinese Patent Application No. 201110447849.X filed on Dec. 28, 2011, entitled "Method and Device for Publishing Promotion Contents", whose applicant is Tencent Technology (Shenzhen) Co., Ltd. The full text of each application is incorporated by reference in its entirety in the present application.

FIELD OF THE TECHNICAL

The present disclosure relates to Internet technology, particularly to a method, and device for pushing promotion contents to different platforms or devices and computer storage medium.

BACKGROUND

Most of existing processes for pushing promotion contents can only be used in a few specific platforms, which cannot be compatible with some other platforms or devices. For example, the promotion content pushing platform of Apple Inc only supports iOS operating system platform, while the promotion content pushing platform of Google Inc supports Android and iOS operating system platform.

In addition, the existing processes for pushing the promotion contents cannot achieve a precise delivery according to functions of clients. For example, by using the existing processes, the service provider cannot push promotion contents according to information about whether a client has opened a specific function or not.

SUMMARY

In view of the above, a method and device for publishing promotion content and computer storage medium are provided in the present disclosure. The method and device have a better compatibility and by which accurate deliveries of the promotion contents can be achieved.

The technical scheme of the present disclosure will be discussed in detail below.

According to an embodiment of the present disclosure, a method for publishing promotion contents includes:

setting up, by a server, publishing parameters for a promotion content, the publishing parameters comprising types of platforms and types of devices suitable for the promotion content;

receiving, by the server, a login request from a client, the login request containing type of platform and type of device of the client;

selecting, by the server, a promotion content suitable for the client according to the publishing parameters of the promotion content, the type of the platform and the type of the device of the client;

issuing, by the server, a description file of the promotion content selected to the client;

receiving, by the server, a resource request from the client; and issuing, by the server, at least one resource file of the promotion content selected to the client.

Another example of the present disclosure also provides a device for publishing promotion content, including:

a setting module, configured to set up publishing parameters for a promotion content, the publishing parameters comprising types of platforms and types of devices suitable for the promotion content;

a selecting module, configured to select a promotion content suitable for a client according to the publishing parameters of the promotion content after receiving a login request from the client, the login request containing type of platform and type of device of the client; and an issue module, configure to issue a description file of the promotion content to the client, and issue at least one resource file of the promotion content suitable for the client according to a resource request from the client.

Yet another example of the present disclosure also provides a computer storage medium, which stores computer programs performing the method for publishing promotion contents according to an example of the present disclosure.

Another example of the present disclosure also provides a computing device for publishing promotion contents, which includes:

one or more processors;

a memory; and one or more programs stored in the memory and to be executed by the one or more processors, the one or more programs comprise instructions to to direct the one or more processors to perform acts of:

setting up publishing parameters for a promotion content, the publishing parameters comprising types of platforms and types of devices suitable for the promotion content;

receiving a login request from a client, the login request containing type of platform and type of device of the client;

selecting a promotion content suitable for the client according to the publishing parameters of the promotion content, the type of the platform and the type of the device of the client;

issuing a description file of the promotion content selected to the client;

receiving a resource request from the client; and issuing at least one resource file of the promotion content selected to the client.

According to the example of the present disclosure, the server issues an information description file to the client. The client then downloads promotion content suitable for its own operation system platform and device according to the information description file. Thus the method can be used in different platforms and devices including iOS, Android, WinCE, S60v3 and etc. The server disclosed in the present disclosure can identify the platform of the client, the type of the device and the function opened on the client, thus an accurate delivery of promotion content to specific type of client can be achieved.

DETAILED DESCRIPTION

To make the objective, technical solutions and advantages of the present invention clearer, examples of the present invention would be described in further detail with reference to the drawings.

Figure 1:
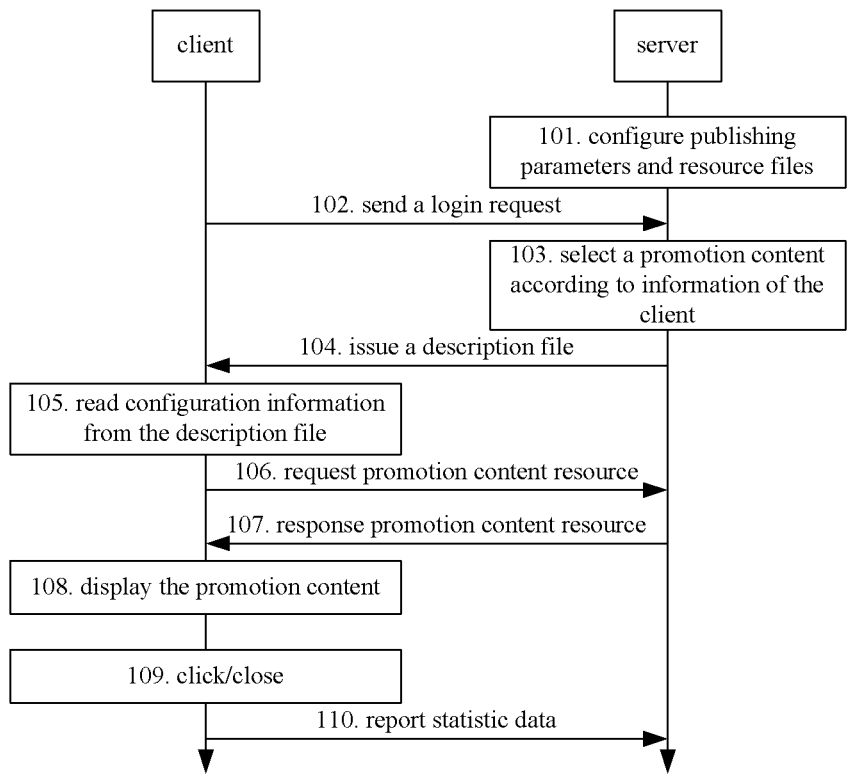
FIG. 1 is a flowchart illustrating a method for publishing promotion contents according to an example of the present disclosure.

FIG. 1 is a flowchart illustrating a method for publishing promotion contents (namely, promotion content publishing method) according to an example of the present disclosure. According to FIG. 1, the method includes the following steps.

In step 101, publishing parameters of a promotion content are configured in a server, and resource files of the promotion content are deployed.

According to the example of the present disclosure, the publishing parameters of the promotion content are configured based on types of platforms and types of devices of clients suitable for the promotion content.

The promotion content includes at least one of the following: texts, images, animations, videos and contents in other multi-media formats.

The publishing parameters are used to indicate the types of the platforms and devices suitable for the promotion content, published time information (such as a valid starting and ending time, display duration and etc.), background information (such as a Uniform Resource Locator (URL) of a background image, etc.), a target URL, display policy information (such as whether to allow a user to close and etc.). The publishing parameters may be stored in a publishing parameter list in a database. According to an example of the present disclosure, fields of the publishing parameter list are listed in Table 1:

TABLE 1 publishing parameter list

| FIELD | DESCRIPTION | NOTE |
| --- | --- | --- |
| ID | An ID of a promotion content | Globally unique, used to determine whether the promotion content has been issued, and to report statistical data from the client |
| Platform | Types of compatible platforms, i.e. the types of operating systems | For example, may include iOs, Android, S60 and etc |
| Device | Types of compatible devices | For example, may include iPhone, iPad, Android, S60v3, S60v5 and etc |
| Version | A range of versions of the compatible platforms | The server only issues the promotion content to a client whose operating system's version is within this range |
| Start time | A valid starting time of the promotion content | The promotion content would be valid and issued only after the start time |
| End time | A valid ending time of the promotion content | The promotion content would be invalid and no longer issued after the end time |
| Continue | A duration of time for displaying the promotion content | Starting from the time that the client receives the promotion content, if the promotion content has not been clicked open or closed during this duration, automatically close the promotion content |
| Background image | Name of the background image of the promotion content | The client may obtain the background image of the promotion content from the server according to this field |
| Enable close | Whether to allow the user to close the promotion content | If the value of "enable close" is true, after the user click the promotion content, the displayed window would be closed; otherwise, the displayed window would not be closed until the promotion content becomes invalid (refer to the description of "continue") |
| URL | A target URL of the promotion content | The URL of the link to be jumped to after a clicking operation |

In step 102, the client sends a login request to the server, wherein the request including the type of the platform and the type of the device of the client.

Further, the login request may further include the version of the platform (such as, iOS 4.3.3, iOS 5 and etc.) of the client. In different versions of operating systems, different system functions can be provided. Therefore, the server can further refine the condition of selecting promotion contents for the clients according to the version of the platform besides the type of the platform and the type of the device of the client. Thus a more accurate delivery of promotion content can be achieved.

In step 103, the server selects a promotion content suitable for the client according to the publishing parameters configured and the type of the platform and device of the client contained in the login request.

The server may select the promotion content suitable for the client based on the following conditions:

1) whether current time is within the duration between the valid starting time and valid ending time of the promotion content, the result can be obtained based on the valid starting time of the promotion content and the valid ending time of the promotion content in the publishing parameters;

2) whether the type of the platform and the type of the device matches the publishing parameters of the promotion content; the result can be obtained by comparing the type of the platform and the type of the device of the client contained in the login request and the types of compatible platforms and the types of compatible devices of the promotion content in the publishing parameters.

In one example of the present disclosure, the selecting conditions can be further refined to achieve a more accurate delivery. In this example, the login request from the client further includes the version of the platform of the client. And the server determines whether the promotion content is suitable for the client based on "version" configured in the publishing parameters, which refers to the range of the versions of compatible platforms.

In another example of the present disclosure, the selecting conditions can be further refined to achieve a more accurate delivery. In this example, the server may track the state of a specific function on each client. When clients open/close the specific function, the server would record the state of the specific function on the clients. And after receiving a login request from a client, the server may make a decision on whether to issue a promotion content based on the state of the specific function on the client.

In step 104, the server issues to the client a description file of the promotion content selected for the client.

According to an example of the present disclosure, one description file is configured for one promotion content. And the server would issue a same description file to all platforms the server supports (dataflow is small because no background image is attached). The description file includes content information corresponding to each type of platform and device, configuration information of the publishing parameters. The content information may include title, introduction and etc. the configuration information of the publishing parameters may include source information of the background image (URL of the background image), a target URL, publishing time information (such as a valid starting/ending time, a display duration time and etc), display policy information (such as whether to allow the user to close and etc.) and etc. With respect to a same promotion content, the client may only analyze the description information of its own platform and display according to the result of the analyzing.

In step 105, after receiving the description file, the client may analyze the description file; obtain the content information corresponding to its own platform and the configuration information of the publishing parameters.

In the publishing parameter list, the field "platform" is used to indicate the platforms the promotion content can be issued to or the compatible platforms. If the field "platform" includes only one platform, the promotion content can be issued only to this platform. The server may issue the promotion content to the user corresponding to the type of the platform of the user based on the type of the platform contained in the login request. While if the field "platform" includes a plurality of types of platforms, the server may configure different background images, different target URLs to different platforms. And the server may issue a same description file to all the platforms supported. The description file describes configuration information corresponding to each platform. With respect a same promotion content, the client may only analyze the description information of its own platform and display according to the result of the analyzing.

According to an example of the present disclosure, the description file may be in a format of Extensible Markup Language (XML).

```
<tips>
  <tip id="bindphone" platform="android" device="" enableclose="true" transparentclose="true">
    <title x="60" y="0" width="120" color="#ffffff">title of promotion content 1</title> // text formats are different
    <description x="60" y="23" width="200" >introduction of promotion content1</description>
    <images> // background image
    <image type="MDPI_P">weixin://PushSystemMsg/setavatar_mdpi_landscape.jpg</image>
    <image type="MDPI_L">weixin://PushSystemMsg/setavatar_mdpi_potrait.jpg</image>
    </images>
    <url>http://misc.3g.qq.com/g/s?aid=template&tid=fast&g_f=2900</url>// target URL
    <time>
      <start>2011-06-16-17</start>//valid starting time
      <end>2011-06-17-17</end> //valid ending time
    </time>
  </tip>
  <tip id="bindphone" platform="ios" device="iphone" enableclose="true" transparentclose="true">
    <title x="60" y="0" width="120" >title 2 of promotion content</title>
    <description x="60" y="23" width="200" >introduction 2 of promotion content</description>
    <images>
      <image type="hd">weixin://PushSystemMsg/SystemTip_bindphone_hd.png</image>
      <image type="sd">weixin://PushSystemMsg/SystemTip_bindphone_sd.png</image>
    </images>
    <url>weixin://setting/bindphone</url>// target URL
    <time>
      <start>2011-06-17-17</start>//valid starting time
      <end>2011-06-18-17</end> //valid ending time
      <continue>3</continue>//display duration time
    </time>
  </tip>
  <tip id="bindphone" platform="symbian" device="v3" enableclose="true" transparentclose="true">
    <title x="60" y="0" width="120" color="#ffffff">title 3 of promotion content</title>
    <description x="60" y="23" width="200" >introduction 3 of promotion content</description>
    <images>
      <image type="hd">weixin://PushSystemMsg/psm_test_hd.png</image>
      <image type="sd">weixin://PushSystemMsg/psm_test_sdpng</image>
    </images>
    <url>weixin://setting/bindphone</url>
    <time>
      <start>2011-06-16-17</start>
      <end>2011-06-17-17</end>
    </time>
  </tip>
</tips>
```

In step 106, the client sends a resource request to the server according to the configuration information corresponding to the type of the platform and the type of the device in the description file, and obtains at least one resource file of the promotion content designated from the server. The resource file refers to a file which the promotion content relies on, such as a background image and etc.

According to examples described above, different platforms and different devices use different background images. The client obtains a background image suitable for its own device from the server according to the type attribute of background images. For example, the background image of an iPhone 4 is a high definition (HD) image (image type="hd"), while the background image of an iPhone 3 or iPod is a standard definition image (image type="sd").

In step 107, the server issues at least one corresponding resource file of the promotion content according to the request of the client.

In step 108, the client displays the promotion content according to configurations in the description file.

In step 109, after the client closes the promotion content or after the promotion content becomes invalid, the client reports statistic data corresponding to the promotion content to the server which would help the server to evaluate the publication of the promotion content.

Figure 2:
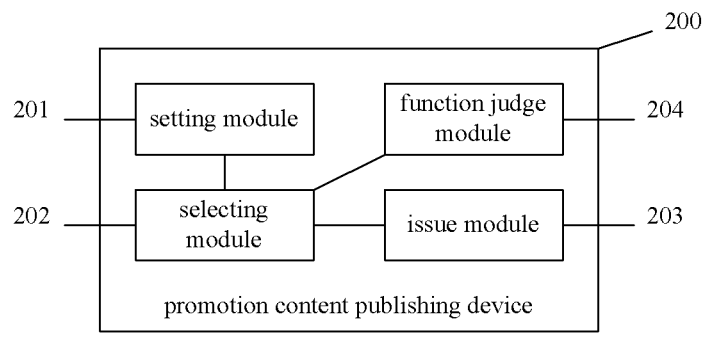
FIG. 2 is a schematic diagram illustrating architecture of a device for publishing promotion contents according to an example of the present disclosure.

FIG. 2 is a schematic diagram illustrating architecture of a device for publishing promotion contents (namely, promotion content publishing device) according to an example of the present disclosure. According to FIG. 2, the device 200 includes the following modules.

A setting module 201, configured to set up publishing parameters for a promotion content. For different types of platforms and devices of the clients, different publication parameters can be set up for a same promotion content.

A selecting module 202, configured to select a promotion content suitable for the platform and the device of the client according to the publishing parameters of the promotion content after receiving a login request from a client.

Preferably, the login request of the client may include: type of the platform of the client, type of the device of the client and version of the platform of the client. The selecting module 202 may select the promotion content suitable for the client according to the type of the platform, the type of the device and the version of the platform of the client.

An issue module 203, configured to issue a description file of the promotion content selected to the client, and issue at least one resource file of the promotion content suitable for the platform and device of the client according to a resource request of the client; wherein the description file contains content information corresponding to each type of platform and device and configuration information corresponding to the publishing parameters.

Preferably, the device may further include a function judging module 204, configured to judge whether the client has opened a specific function or some specific functions according to a user identity (ID) contained in the login request of the client.

The selecting module 202 selects the promotion content suitable for the client according to the type of the platform, the type of the device and a judging result from the function judging module 204.

Preferably, the description file issued by the issue module 203 contains content information corresponding to each type of platform and device and configuration information corresponding to the publishing parameters. The configuration information corresponding to the publishing parameters contains resource information of a background image, a target URL, published time information and display policy information.

After receiving the description file, the client obtains the content information and configuration information from the description file according to the type of its own platform and device.

If modules in the above examples are implemented by software and in the form of a product which can be sold or used independently, the modules can also be stored in a computer readable storage medium. Based on such understanding, the technical solutions of the present disclosure or the part contributing to the prior art may be embodied in the form of a software product. The software product may be stored in a storage medium, which includes a plurality of instructions making a computing device (such as a personal computer, a server, or a network equipment) to perform all or part of various examples of the method of the present disclosure. The storage medium may be any kind of non-transitory medium capable of storing program code, which may include any of a U disk, a mobile hard disk, read-only memory (ROM, Read-Only Memory), random access memory (RAM, Random Access Memory), a disk or an optical disk. Thus, examples of the present disclosure are not limited to any specific combination of hardware and software.

Yet another example of the present disclosure also provides a computer storage medium, which stores computer programs being executed to perform the method for publishing promotion content according to an example of the present disclosure.

Still another example of the present disclosure provides a computing device for publishing promotion contents, which includes: one or more processors; a memory; and one or more programs stored in the memory and to be executed by the one or more processors, the one or more programs comprise instructions to direct the one or more processors to perform acts of:

setting up publishing parameters for a promotion content, the publishing parameters comprising types of platforms and types of devices suitable for the promotion content;

receiving a login request from a client, the login request containing type of platform and type of device of the client;

selecting a promotion content suitable for the client according to the publishing parameters of the promotion content, the type of the platform and the type of the device of the client;

issuing a description file of the promotion content selected to the client;

receiving a resource request from the client; and issuing at least one resource file of the promotion content selected to the client.

The above are only preferred examples of the present disclosure without any intention to limit the scope of the present invention.

The invention claimed is:

1. A method for publishing promotion contents, comprising:
   setting up, by a server, publishing parameters for a promotion content, the publishing parameters comprising types of platforms and types of devices suitable for the promotion content;
   receiving, by the server, a login request from a client, the login request containing a user identity (ID), a version of the platform, a type of platform and a type of device of the client;
   obtaining, by the server, information about whether the client has opened a specific function or some specific function according to the user ID;
   selecting, by the server, a promotion content suitable for the client according to the publishing parameters of the promotion content, the version of the platform, the type of the platform, the type of the device of the client, and the information about whether the client has opened a specific function or some specific function;
   issuing, by the server, a description file of the promotion content selected to the client;
   receiving, by the server, a resource request from the client; and
   issuing, by the server, at least one resource file of the promotion content selected to the client.

2. The method according to claim 1, wherein, the description file contains content information corresponding to each type of platform and device and configuration information corresponding to the publishing parameters;
   wherein the configuration information corresponding to the publishing parameters contains resource information of a background image, a target URL, published time information and display policy information; and wherein the method further comprises: obtaining, by the client, the content information and the configuration information from the description file according to the type of its own platform and device after receiving the description file.

3. The method according to claim 1, wherein, the description file is described in XML language.

4. A device for publishing promotion content, comprising:

one or more processors and one or more computer storage media storing instructions that when executed by the one or more processors, cause the one or more processors to perform operations comprising:

setting up publishing parameters for a promotion content, the publishing parameters comprising types of platforms and types of devices suitable for the promotion content;

receiving a login request from a client, the login request containing a user identity (ID), a version of the platform, a type of platform and a type of device of the client;

judging whether the client has opened a specific function or some specific function according to the user ID contained in the login request of the client;

selecting a promotion content suitable for a client according to the publishing parameters of the promotion content, the type of the platform, the version of the platform, the type of device of the client and a judging result; and issuing a description file of the promotion content to the client, and issue at least one resource file of the promotion content suitable for the client according to a resource request from the client.

5. The device according to claim 4, wherein, the description file contains content information corresponding to each type of platforms and devices and configuration information corresponding to the publishing parameters;

wherein the configuration information corresponding to the publishing parameters contains resource information of a background image, a target URL, published time information and display policy information; and after receiving the description file, the client obtains promotion content and configuration information from the description file according to the type of its own platform and device.

6. The device according to claim 4, wherein, the description file is described in XML language.

7. A non-transitory computer storage medium, comprising a set of instructions for publishing promotion contents, the set of instructions to direct at least one processor to perform acts of:

setting up publishing parameters for a promotion content, the publishing parameters comprising types of platforms and types of devices suitable for the promotion content;

receiving a login request from a client, the login request containing a user identity (ID), a version of the platform, a type of platform and a type of device of the client;

obtaining information about whether the client has opened a specific function or some specific function according to the user ID;

selecting a promotion content suitable for the client according to the publishing parameters of the promotion content, the version of the platform, the type of the platform, the type of the device of the client and the information about whether the client has opened a specific function or some specific function;

issuing a description file of the promotion content selected to the client;

receiving a resource request from the client; and issuing at least one resource file of the promotion content selected to the client.

8. A computing device for publishing promotion contents, comprising:

one or more processors;

a memory; and one or more programs stored in the memory and to be executed by the one or more processors, the one or more programs comprise instructions to direct the one or more processors to perform acts of:

setting up publishing parameters for a promotion content, the publishing parameters comprising types of platforms and types of devices suitable for the promotion content;

receiving a login request from a client, the login request containing a user identity (ID), a version of the platform, a type of platform and a type of device of the client;

obtaining information about whether the client has opened a specific function or some specific function according to the user ID;

selecting a promotion content suitable for the client according to the publishing parameters of the promotion content, the version of the platform, the type of the platform, the type of the device of the client and the information about whether the client has opened a specific function or some specific function;

issuing a description file of the promotion content selected to the client;

receiving a resource request from the client; and issuing at least one resource file of the promotion content selected to the client.

* * * * *